(12) United States Patent
Ritt et al.

(10) Patent No.: US 7,327,902 B2
(45) Date of Patent: Feb. 5, 2008

(54) OPTIMIZING IMAGE ALIGNMENT

(75) Inventors: Daniel M. Ritt, Colorado Springs, CO (US); Matthew L. Whitaker, Colorado Springs, CO (US)

(73) Assignee: Radiological Imaging Technology, Inc., Colorado Springs, CO (US)

( * ) Notice: Subject to any disclaimer, the term of this patent is extended or adjusted under 35 U.S.C. 154(b) by 335 days.

(21) Appl. No.: 11/009,602

(22) Filed: Dec. 10, 2004

(65) Prior Publication Data

US 2006/0147102 A1    Jul. 6, 2006

(51) Int. Cl.
G06K 9/32    (2006.01)
G06K 9/00    (2006.01)

(52) U.S. Cl. ..................................... 382/294
(58) Field of Classification Search ............... 382/128, 382/132, 154, 172, 218, 254, 276, 277, 280, 382/284, 287, 294
See application file for complete search history.

(56) References Cited

U.S. PATENT DOCUMENTS

| | | | |
|---|---|---|---|
| 5,095,217 A | | 3/1992 | Attix |
| 5,295,200 A | * | 3/1994 | Boyer .................... 382/280 |
| 5,581,637 A | * | 12/1996 | Cass et al. ............... 382/284 |
| 6,075,905 A | * | 6/2000 | Herman et al. ........... 382/284 |
| 6,219,462 B1 | | 4/2001 | Anandan et al. |
| 6,225,622 B1 | | 5/2001 | Navarro |
| 6,298,115 B1 | | 10/2001 | Nilsson |
| 6,333,964 B1 | | 12/2001 | Hobel |
| 6,345,114 B1 | | 2/2002 | Mackie et al. |
| 6,459,821 B1 | * | 10/2002 | Cullen .................... 382/294 |
| 6,512,857 B1 | * | 1/2003 | Hsu et al. ................ 382/294 |
| 6,528,803 B1 | | 3/2003 | Ritt |
| 6,563,942 B2 | | 5/2003 | Takeo et al. |
| 6,675,116 B1 | | 1/2004 | Ritt |
| 6,754,374 B1 | | 6/2004 | Miller et al. |

(Continued)

FOREIGN PATENT DOCUMENTS

WO    WO 01/43070    6/2001

OTHER PUBLICATIONS

Ton J. et al: "Registering Landsat Images By Point Matching" IEEE Transactions on Geoscience and Remote Sensing, IEEE Service Center, Piscataway, NJ, US, vol. 27, No. 5 Sep. 1, 1989, pp. 642-648, XP000053188, ISSN: 0196-2892.

(Continued)

*Primary Examiner*—Amir Alavi
(74) *Attorney, Agent, or Firm*—Rader, Fishman & Grauer PLLC

(57) ABSTRACT

Optimizing an alignment of a first image having a first set of points and a second image having a second set of points includes selecting at least one point in the first set of points; selecting at least one point in the second set of points, each selected point in the second set of points corresponding to at least one of the at least one selected points in the first set of points; calculating at least one alignment index related to the at least one selected point in the second set of points; and generating an optimization based on the alignment index. Some embodiments further include applying the optimization to at least one of the points selected in the second set of points, thereby optimizing the alignment of the second image with the first image.

23 Claims, 3 Drawing Sheets

U.S. PATENT DOCUMENTS

| | | | |
|---|---|---|---|
| 6,754,379 B2* | 6/2004 | Xiong et al. | 382/154 |
| 7,106,891 B2* | 9/2006 | Wyman et al. | 382/128 |
| 2002/0048393 A1 | 4/2002 | Oosawa | |
| 2002/0106054 A1 | 8/2002 | Caflisch et al. | |

OTHER PUBLICATIONS

Tretiak O. et al. "Geometric signal processing and applications to brain mapping" Acoustics, Speech, and Signal Processing, 1995, ICASSP-95., 1995 International Conference on Detroit, MI, USA May 9-12, 1995, New York, NY, USA, IEEE, US, vol. 5, May 9, 1995, pp. 2915-2918, XP010151954, ISBN: 0-7803-2431-5.

International Search Report (extended European search) EP 05 02 6777 dated Jun. 26, 2006 (4 pages).

Childress N. et al. "Rapid radiographic film calibration for IMRT verification using automated MLC fields" Med. Phys. AIP, Melville, NY, US, vol. 29, No. 10, Oct. 2002, pp. 2384-2390, XP012011627, ISSN: 0094-2405.

Low D. A. et al: "Towards automated quality assurance for intensity modulated radiation therapy: film densitometry" proceedings of the $22^{nd}$ annual international conference of the IEEE engineering in medicine and biology society (CAT. No. 00CH37143) IEEE Piscataway, NJ, USA, vol. 1, 2000, pp. 184-187 vol. 1, XP002378228.

Low D. A. et al: "Toward automated quality assurance for intensity-modulated radiation therapy" International Journal of Radiation Oncology Biology Physics Elsevier USA, vol. 53, No. 2, Jun. 1, 2002, pp. 443-452, XP002378229, ISSN: 0360-3016.

International Search Report (extended European search) EP 06 00 0795 dated Apr. 25, 2006 (4 pages).

D.A. Low, J.F. Dempsey, "Evaluation of the gamma dose distribution comparison method"; Med. Phys. 30, 2455-2464 (Sep. 2003).

J.M. Fitzpatrick, J.B. West, C.R. Manrer Jr., "Predicting Error in Rigid-Body Point Based Registration," IEEE Transactions on Medical Imaging, 17(5): 694-702, Oct. 1998.

ACR Bulletin, "New Intensity-modulated Radiation Therapy Codes for Hospital Outpatient Procedures," Apr. 2001, vol. 57, Issue 4, pp. 4-5, 10.

International Search Report of International App. No. PCT/US 01/29327.

Oldham et al.; "Improving Calibration Accuracy in Gel Dosimetry,"; *Phys. Med. Biol.*, vol. 43 (1998), pp. 2709-2720.

Maryanski M. J. et al.; "Radiation Therapy Dosimetry Using Magnetic Resonance Imaging of Polymer Gels," Med. Phys. vol. 23, No. 5, May 1, 1996 pp. 699-705.

Oldham et al,. "An Investigation into the Dosimetry of a Nine-Field Tomotherapy Irradiation Using BANG-gel Dosimetry," Phys. Med. Biol., vol. 43 (1998), pp. 1113-1132.

Williamson et al.; "Film Dosimetry of Megavoltage Photon Beams: A Practical Method of Isodensity-to-Isodose Curve Conversion," Med. Phys., vol. 8, No. 1, Jan./Feb. 1981, pp. 94-98.

Kepka et al.; "A Solid-State Video film Dosimetry System," Phys. Med. Biol., vol. 28, No. 4 (1983), pp. 421-426.

Yunping Zhu et al.; "Portal Dosimetry Using a Liquid Ion Chamber Matrix: Dose Response Studies,", Med Phys., vol. 22, No. 7, Jul. 1995, pp. 1101-1106.

Munro P. et al.; "X-ray Quantum Limited Portal Imaging Using Amorphous Silicon Flat-Panel Arr;ays," Med. Phys., vol. 25, No. 5, May 1998, pp. 689-702.

D.A. Low, W.B. Harms, S. Mutic and J.A. Purdy, "A Technique For the Quantitative Evaluation of Dose Distributions"; Med. Phys. 25, 656-661 (May 1998).

Nathan L. Childress and Isaac I. Rosen, The Design and Testing of Noval Clinical Parameters for Dose Comparison, Int. J. Radiation Oncology Biology Physics, vol. 56, No. 5, pp. 1464-1479 (2003).

J. Van Dyk et al., "Commissioning and Quality Assurance of Treatment Planning Computers", International Journal of Radiation Oncology Biology Physics, vol. 26, No. 2 pp. 261-271 (1993).

Chester R. Ramsey and Daniel Chase, Clinical Implementation of IMRT in a Community Setting (2002; published by Radiation Physics Specialists of Knoxville, Tennessee).

\* cited by examiner

OPTIMIZING IMAGE ALIGNMENT

FIELD

The present application relates in general to image processing. More specifically, the present application relates to optimizing image alignment.

RELATED APPLICATIONS

This application is related to U.S. patent application Ser. No. 10/630,015, filed Jul. 30, 2003, entitled SYSTEM AND METHOD FOR ALIGNING IMAGES, the contents of which are hereby incorporated herein by reference in their entirety.

BACKGROUND

Image processing often requires that two or more images from the same source or from different sources be "registered," i.e., aligned, so that they occupy the same image space. That is, image registration comprises the process of identifying a mapping, or correspondence, between points (e.g., pixels or voxels) in a first image and points (e.g., pixels or voxels) in a second image. Once such a mapping has been accomplished, the images can be said to occupy the same image space. There are many techniques known in the art for registering images, including techniques for one, two, and three dimensional images.

Once aligned to the same image space, the aligned images can be useful in many applications. One such possible application is in medical imaging. For example, an image produced by positron emission tomography imaging ("PET"), and an image produced by computerized axial tomography ("CAT" or "CT") can be registered, i.e., aligned, to accurately depict an area of the body. This technique may be applied to images from film, three dimensional gels, electronic portal imaging devices (EPID), digital radiography (DR) devices, computed radiography (CR) devices, and many other image sources. Additionally, a single alignment may be applied to multiple target images.

Another application of image registration is for quality assurance measurements. For example, the practice of radiation oncology often requires image treatment plans to be compared to acquired quality assurance images to determine whether the treatment plans are being executed accurately. A dose distribution treatment is planned and represented in an image (a "plan image" or "reference image"). An actual dose distribution associated with the planned distribution is then executed and captured in a second image (the "measured image" or "target image"). Next, the plan image is registered (i.e., aligned) with the measured image using conventional image registration techniques. Once the plan image and the measured image are registered in the same image space, known techniques can be used to measure the goodness of fit between the two aligned images. Goodness-of-fit measurements are useful for indicating differences between the planned dose distribution and the measured dose distribution.

From goodness of fit measurements, a level of accuracy of the actually delivered dose distribution can be determined relative to its associated planned dose distribution. Examples of techniques for comparing registered images to quantitatively evaluate the accuracy of planned dose distributions are provided in D. A. Low, W. B. Harms, S. Mutic, and J. A. Purdy, "A technique for the quantitative evaluation of dose distributions," Med. Phys. 25, 656–661 (May 1998) (hereinafter "Low et al."), fully incorporated by reference herein, and Nathan L. Childress and Isaac I. Rosen, "The Design and Testing of Novel Clinical Parameters for Dose Comparison, Int. J. Radiation Oncology Biology Physics, Vol. 56, No. 5, pp. 1464–1479 (2003), also fully incorporated by reference herein. As described by Low et al., dose differences and distance-to-agreement measurements are obtained from registered dose distribution images and used to calculate numerical quantifications of the goodness of fit between the measured and planned dose distributions represented in the registered images. Distance to Agreement (DTA) is the distance between a reference point (e.g., a pixel) in the measured image and the nearest point in the planned image that exhibits the same dosage value to a specified precision. Dose difference is the difference in dosage values (often represented by pixel intensities) between points in the plan image and the measured image.

As discussed by Low et al., the dose difference and DTA between different points located in a common image space are capable of graphical representation. FIGS. 1A and 1B illustrate geometric representations of the dose difference and DTA for a particular reference point 12 of the measured image and a particular target point 14 of the plan image located in a common image space.

FIG. 1A illustrates use of each of the dose difference and DTA tests to determine whether images are satisfactorily aligned. Reference point 12 is located at the origin of a graph 10 representing the image space. The x and y axes 16 and 18 of graph 10 represent the spatial location of target point 14. A third, or δ, axis 20 of graph 10 represents the dose difference 22 between a measured dose distribution represented at point 12 and a planned dose distribution represented at point 24.

A comparison of the location of reference point 12 and target point 14 on graph 10 can be made to determine whether the DTA 26 of points 12 and 14 exceeds a predetermined DTA criterion 30. DTA criterion 30 is represented by a circle 32, where the radius of circle 32 is equal to DTA criterion 30. If target point 14 lies within the circle 32, then DTA 26 meets DTA criterion 30. Similarly, if a line can be drawn representing dose difference 22 whose length is less than dose difference criterion 34, then target point 14 passes the dose distribution test.

Dose difference 22 and DTA 26 can be used together to evaluate the planned dose distribution in relation to the measured dose distribution. FIG. 1B illustrates a composite acceptance criterion 40 in the form of an ellipsoid that simultaneously considers the dose-difference criterion 34 and the DTA criterion 30 to determine whether the goodness of fit between the measured and planned images is at an acceptable level of accuracy. If any portion of the planned dose distribution 24 intersects the ellipsoid, the planned dose distribution 24 is determined to pass the composite acceptance criterion 40, i.e., planned dose distribution 24 has an acceptable level of accuracy in relation to the measured dose distribution.

Equations 1–7 below provide the basis for composite acceptance criterion 40. In Equations 1–7, $r_m$ denotes the position of reference point 12; $r_c$ denotes the position of target point 14; $D_m$ denotes the dose distribution at reference point 12; $D_c$ denotes the dose distribution at target point 14; $\Delta d_m$ denotes DTA criterion 30; and $\Delta D_m$ denotes dose-difference criterion 34.

Equations 1–3 define composite acceptance criterion 40. Equation 1 defines the surface of the composite acceptance criterion 40 shown in FIG. 1B. Further, as will be understood by those skilled in the art, Equations 2 and 3 make clear that the ellipse defined by Equation 1 depends on DTA and dose difference calculations respectively.

Equation 1:

$$1 = \sqrt{\frac{r^2(r_m, r_c)}{\Delta d_M^2} + \frac{\delta^2(r_m, r_c)}{\Delta D_M^2}}$$

Equation 2:

$$r(r_m, r_c) = |r_c - r_m|$$

Equation 3:

$$\delta(r_m, r_c) = D_c(r_c) - D_m(r_m)$$

Composite acceptance criterion 40 can be used to calculate numerical quantifications of the goodness of fit between planned and calculated dose distributions. More specifically, a gamma index ($\gamma$) is calculated at each point in the plane defined by circle 32 for the reference point 12 using Equations 4–7.

Equation 4:

$$\gamma(r_m) = \min\{\Gamma(r_m, r_c)\} \forall \{r_c\}$$

Equation 5:

$$\Gamma(r_m, r_c) = \sqrt{\frac{r^2(r_m, r_c)}{\Delta d_M^2} + \frac{\delta^2(r_m, r_c)}{\Delta D_M^2}}$$

Equation 6:

$$r(r_m, r_c) = |r_c - r_m|$$

Equation 7:

$$\delta(r_m, r_c) = D_c(r_c) - D_m(r_m)$$

Accordingly, a planned dose distribution is acceptable when the gamma index ($\gamma$) is less than or equal to one ($\gamma(r_m) \leq 1$) and unacceptable when the gamma index ($\gamma$) calculated in Equations 4 and 5 is greater than one ($\gamma(r_m) > 1$). Those skilled in the art will understand that, using the above equations, planned (i.e., calculated) dose distributions can be evaluated by comparing the goodness of fit between planned dose distributions and measured dose distributions, as represented in plan and measured images that have been registered, i.e., aligned.

In order for evaluative comparison techniques, including the techniques discussed by Low et al., to return reliable and helpful evaluation data, measured and calculated dose distribution images should be aligned as precisely as possible. Without accurate image registrations, errors will be introduced into image comparisons. Such errors are particularly undesirable in the field of radiation oncology, which depends on an accurate comparison of a plan image with a measured images to ensure that patients will receive the proper radiation doses during a course of radiation therapy.

However, image registration is especially problematic in the field of radiation oncology due to the common use of mega-voltage beams for radiation therapy. Images produced from mega-voltage beams tend to have poor resolutions, which render conventional image registration techniques ill-suited for achieving precise alignment of the images for several reasons. For example, cross-correlation alignment techniques do not reliably minimize overall image differences because differences in high-gradient areas may be magnified by small alignment errors and result in large translational shifts to compensate. Other existing techniques rely on the identification of structures or landmark points to use for alignment. However, these techniques are also ill-suited to align mega-voltage images because the poor resolution of the images makes selection of optimum matching points problematic, whether the selection is done manually or automatically. In sum, existing image alignment techniques return suboptimal alignments of poor resolution images because boundaries and landmarks are not well defined in the poorly focused images. Without precise image registration, mega-voltage radiation treatments cannot be reliably evaluated. Thus, it would be desirable to be able to accurately and precisely optimize image alignments, including alignments of mega-voltage images having poor resolutions.

BRIEF SUMMARY

According to an embodiment, optimizing an alignment of a first image having a first set of points and a second image having a second set of points includes selecting at least one point in the first set of points; selecting at least one point in the second set of points, each selected point in the second set of points corresponding to at least one of the at least one selected points in the first set of points; calculating at least one alignment index related to the at least one selected point in the second set of points; and generating an optimization based on the alignment index. Some embodiments further include applying the optimization to at least one of the points selected in the second set of points, thereby optimizing the alignment of the second image with the first image.

According to a further embodiment, optimizing an alignment of a first image having a first set of points and a second image having a second set of points includes selecting at least one point in the first set of points; selecting at least one point in the second set of points, each selected point in the second set of points corresponding to at least one of the at least one selected points in the first set of points; calculating at least one alignment index related to the at least one selected point in the second set of points; comparing the at least one alignment index to a predetermined threshold to determine whether to optimize an alignment of the first image and the second image; and if a determination is made to optimize an alignment of the first image and the second image, generating an optimization based on the at least one alignment index. Some embodiments further include applying the optimization to at least one of the points selected in the second set of points, thereby optimizing the alignment of the second image with the first image.

According to a further embodiment, a computer-readable medium has instructions thereon for optimizing an alignment of a first image having a first set of points and a second image having a second set of points, said instructions being configured to instruct a computer to perform steps comprising selecting at least one point in the first set of points; selecting at least one point in the second set of points, each selected point in the second set of points corresponding to at least one of the at least one selected points in the first set of points; calculating at least one alignment index related to the at least one selected point in the second set of points; and determining an optimization based on the alignment index. Some embodiments further include said instructions further configured to instruct the computer to perform the step of applying said optimization to at least one of the points selected in the second set of points, thereby optimizing the alignment of the second image with the first image.

According to a further embodiment, a system for optimizing an alignment of images comprises a first image having a first set of points and a second image having a second set of points; means for calculating at least one alignment index that is based on an association between at least one point in the first set of points and at least one point in the second set of points; and means for determining an optimization based on said alignment index. Some embodiments further include means for applying the optimization to the second image, thereby transforming the second image toward optimal alignment with the first image.

According to a further embodiment, a system for aligning images, the images including a reference image having reference points and a target image having target points, includes a computer configured to perform the steps of: initially aligning the reference image and the target image; determining whether said initial alignment of the reference image and the target image is within a predetermined threshold; and optimizing said initial alignment if it is determined at said step of determining that said initial alignment is not within said predetermined threshold, wherein said step of optimizing includes: determining at least one of a dose difference and a distance-to-agreement measurement for each of at least a subset of the reference points; calculating a gamma index for each of said at least a subset of the reference points associated with the reference image, said gamma indexes being based on at least one of said dose difference and said distance-to-agreement measurements; defining an optimization based on the lowest overall mean of said gamma indexes; and applying said optimization to at least a subset of the target points of the target image, thereby transforming the target image toward optimal alignment with the reference image.

BRIEF DESCRIPTION OF THE DRAWINGS

The accompanying drawings illustrate various embodiments of the present systems and methods and are a part of the specification. Together with the following description, the drawings demonstrate and explain the principles of the present systems and methods. The illustrated embodiments are examples of the present systems and methods and do not limit the scope thereof.

DETAILED DESCRIPTION

I. Introduction

The accuracy of image registrations that have been formed using known image registration techniques may be improved by determining quantitative goodness-of-fit measurements for such image registrations and adjusting the image registrations based on such goodness-of-fit measurements, thereby optimizing the image registrations, i.e., alignments. Using goodness-of-fit measurements to optimize image registrations is especially beneficial for optimizing registrations of images of mega-voltage beams that have poor resolutions tending to cause less accurate alignments when existing alignment techniques are used. Accordingly, images used for radiation therapy, including mega-voltage images, can be more accurately aligned, making the aligned images more useful and accurate for many different applications.

II. System Overview

Figure 2:
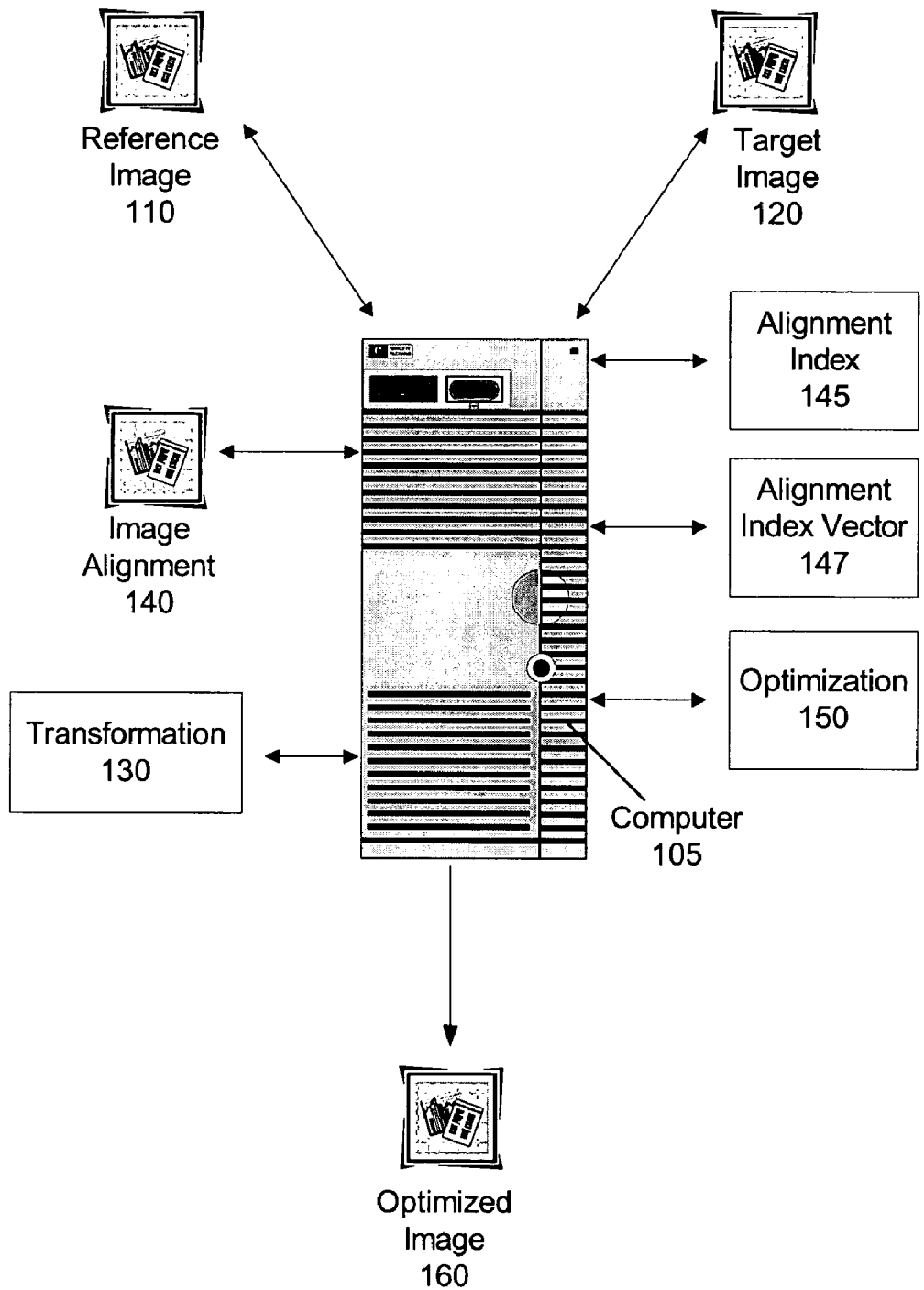
FIG. 2 illustrates an implementation of an image alignment system for optimizing image alignments, according to an embodiment.

FIG. 2 illustrates an image alignment system 100 for optimizing image alignments according to an embodiment. As shown in FIG. 2, a reference image 110 and a target image 120 can be aligned by a computer 105 to form an initial image alignment 140 (i.e., a first registration of images 110 and 120). Computer 105 is able to obtain goodness-of-fit measurements for initial image alignment 140 and to generate one or more alignment indexes 145 based on the goodness-of-fit measurements. Computer 105 is further configured to generate one or more optimizations 150 based on alignment indexes 145 and to apply the optimizations 150 to the initial image alignment 140 to create an optimized image alignment 160.

Each of the foregoing elements of system 100 is described in more detail below. Further, performing optimizations to image registrations, i.e., alignments, will be discussed in detail below.

A. Images

Reference image 110 and target image 120 are any images or visual representations that can be aligned with each other or with one or more other visual representations. Reference image 110 and target image 120 may be visual representations of any dimensionality (e.g., one, two, three, or more dimensions) and can be rendered or represented using known techniques and data types. Reference image 110 and/or target image 120 are often digital images. In particular, reference image 110 and target image 120 may be any representation that can be read, stored, transformed, or otherwise acted upon by computer 105, including graphical and data representations. Typically, reference image 110 and target image 120 include a number of data points (e.g., pixels) that can be accessed, stored, interpreted, displayed, transformed, etc. by computer 105.

In some embodiments, images 110 and 120 are initially captured in a digital format and are stored by computer 105 in an unmodified form, i.e., as captured, prior to the application of any techniques for registering the images 110 and 120. In other embodiments, digital images may be generated from analog images, as will be understood by those skilled in the art. Further, various image enhancement techniques will be known to those skilled in the art and may be applied to an image before it is aligned by the system 100, but the system 100 does not require the performance of such pre-alignment enhancement processing.

In one embodiment, reference image 110 represents measured radiation patterns (i.e., dose distributions), and target image 120 represents planned or calculated radiation patterns. That is, reference image 110 is a measured image, and target image 120 is a plan image. The radiation patterns can be produced by mega-voltage beams typically used for many types of radiation treatments. By application of a transformation 130, target image 120 can be transformed as discussed below to register target image 120 with reference image 110.

B. Computer

Those skilled in the art will recognize that computer 105 may be any device or combination of devices capable of functioning as described herein with respect to system 100, including receiving, outputting, processing, transforming, incorporating, and/or storing information. For example, computer 105 may be a general purpose computer capable of running a wide variety of different software applications. Further, computer 105 may be a specialized device limited to particular functions. In some embodiments (not shown in FIG. 2), computer 105 is a network of computers 130. In general, system 100 may incorporate a wide variety of different information technology architectures. Computer 105 is not limited to any type, number, form, or configuration of processors, memory, computer-readable mediums, peripheral devices, computing devices, and/or operating systems.

Some of the elements of system 100 may exist as representations within computer 105. For example, images to be aligned and optimized by system 100 (e.g., reference image 110 and target image 120) may exist as representations within computer 105.

Computer 105 may include or be coupled to interfaces and access devices for providing users (e.g., a radiological technician) with access to system 100. Thus, users are able to access the processes and elements of system 100 using any access devices or interfaces known to those skilled in the art. This allows users to guide manual registration techniques that may be used to initially align reference images 110 and target images 120. For example, a user may manually select geometrically significant points, features, or landmarks in the images 110 and 120 for use in initial alignment algorithms or procedures, as disclosed in U.S. patent application Ser. No. 10/630,015. Accordingly, computer 105 is able to act upon multiple images in myriad ways, including the execution of commands or instructions that are provided by users of the system 100.

C. Initial Image Alignments

Computer 105 can be configured to form initial image alignments 140 as discussed below. Initial image alignment 140 may be any image registration (i.e., image alignment) that can be subjected to the optimization processes discussed below. Typically, an initial image alignment 140 includes one or more reference images 110 and one or more target images 120 aligned in an image space. Initial image alignments 140 may be formed using known image registration techniques. Thus, computer 105 may be configured to form initial image alignments 140 using known registration techniques. However, it is also contemplated that initial image alignments 140 may be received by computer 105 from external sources.

Because initial image alignments 140 may not be as precise or accurate as desired due to factors such as poor resolution or inaccurate selection of reference points in reference images 110 or target images 120, computer 105 is configured to analyze initial image alignments 140 to determine their alignment quality as discussed below. As discussed below, computer 105 may optimize initial image alignments 140 based on the determined alignment quality.

D. Alignment Indexes and Alignment Quality Index Vectors

From an analysis of a particular initial image alignment 140, computer 105 is configured to generate one or more alignment indexes 145. Alignment indexes 145 include quantified measures of alignment accuracy between points of the reference images 110 and target images 120. The measures of accuracy are defined by multidimensional distances between reference points 12 and target points 14 for dose and/or spatial distance, scaled as a fraction of a predefined acceptance criterion. For example, as discussed above, alignment indexes may be in the form of gamma (γ), distance-to-agreement (DTA), or dose-difference indexes. Other alignment indexes 145, for example, minimum mean-squared error, or the normalized agreement test (NAT) index discussed by Childress and Rosen, incorporated by reference herein above, may be known and used by those skilled in the art. In one embodiment, Equations 1–7 are implemented in computer 105 for calculating alignment indexes 145 between points of the reference and target images 110 and 120. As described further below, alignment indexes 145 may be placed in alignment quality index vectors 147 to facilitate the evaluation of alignment accuracy between registered images 110 and 120.

Figure 1A:
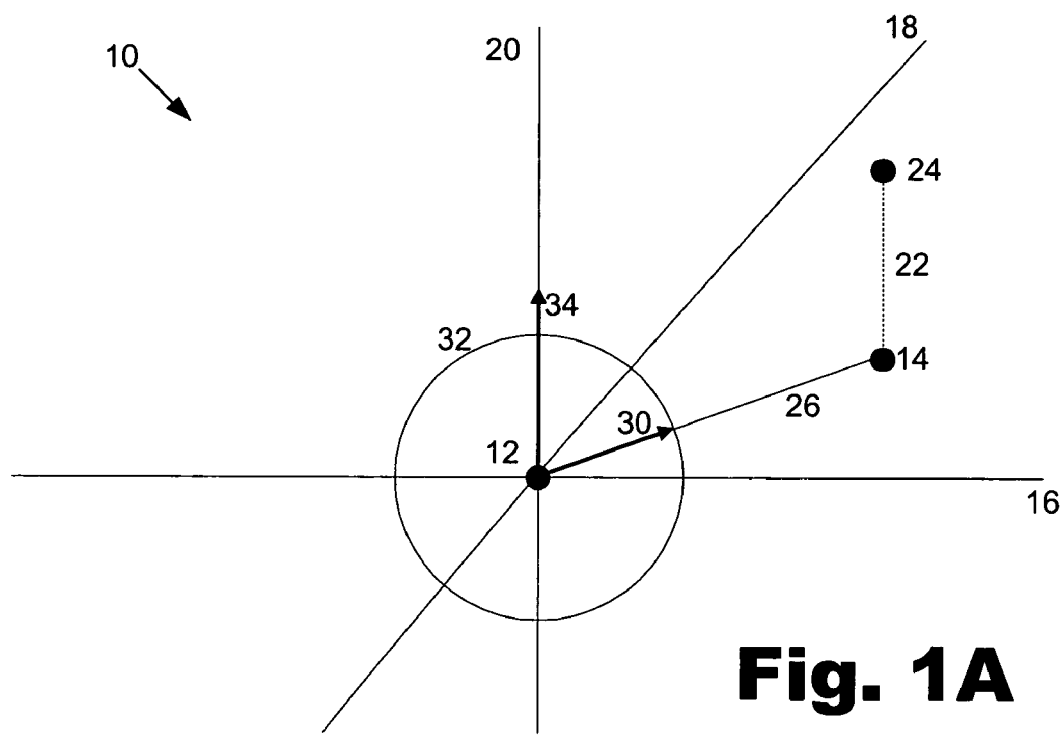
FIGS. 1A and 1B illustrate geometric relationships between dose difference, distance-to-agreement, and gamma parameters.
Figure 1B:
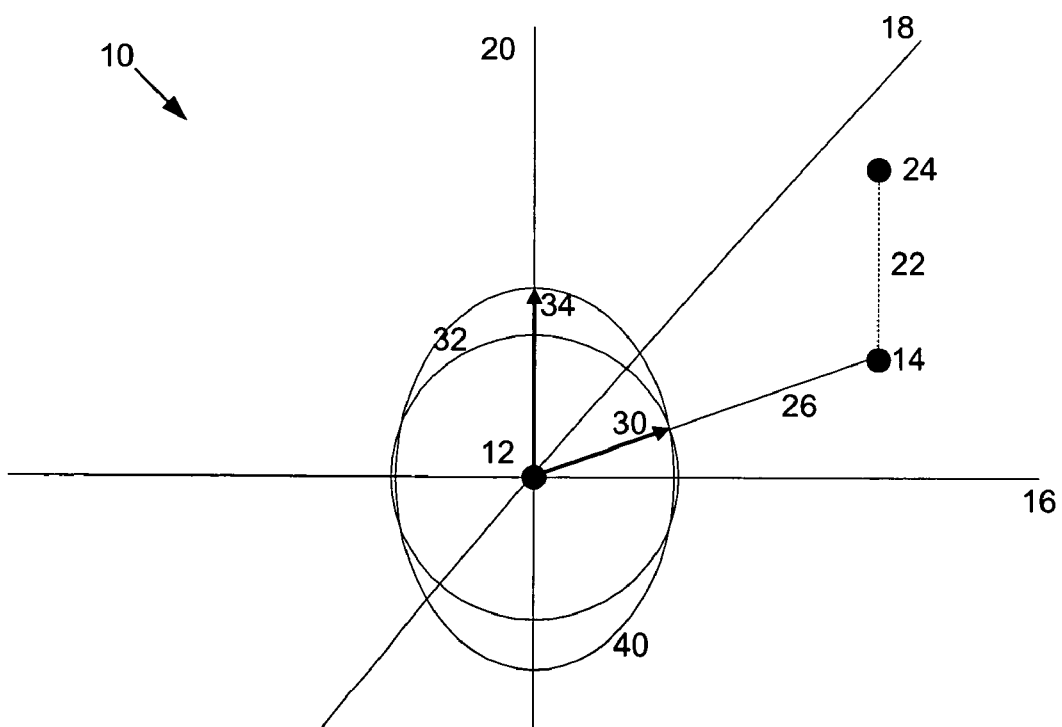

The predefined acceptance criterion may be set to represent a desired level of alignment accuracy between registered images 110 and 120. For example, the acceptance criterion may define a level of accuracy based on dose differences and/or DTA between points of the reference and target images 110 and 120. In one embodiment, the predefined acceptance criterion is the composite acceptance criterion 40 discussed above in reference to FIG. 1. By using the composite acceptance criterion 40, both dose-difference criterion 34 and DTA criterion 30 are considered in a determination of alignment accuracy. The dose-difference criterion 34 and DTA criterion 30 may be predefined to values that define a desired level of accuracy. For example, the dose-difference criterion 34 may be set to a three-percent (3%) difference between points, and the DTA criterion 30 may be set to a three millimeter (3 mm) value.

Those skilled in the art will understand how values for dose-difference criterion 34 and DTA criterion 30 may be selected. For example, those skilled in the art will understand that such values are often selected based on a part of the human anatomy to be treated and/or the particular equipment and the configuration thereof to be employed in providing treatment. Factors that may be considered in selecting values for dose-difference criterion 34 and DTA criterion 30 are further discussed in J. Van Dyk et al., "Commissioning and Quality Assurance of Treatment Planning Computers," International Journal of Radiation Oncology Biology Physics, vol. 26, no. 2 pp. 261–271 (1993) and Chester R. Ramsey and Daniel Chase, Clinical Implementation of IMRT in a Community Setting (2002; published by Radiation Physics Specialists of Knoxville, Tenn.), both of which are fully incorporated by reference herein.

The predefined acceptance criterion may be defined by users of system 100 and/or may be application dependent. For example, in certain applications, users may prefer that the optimization of image alignment be based on both dose-difference and DTA criteria. For other applications, it may be useful for optimizations 150, discussed below, to be based on either dose-difference or DTA criteria. For example, the DTA criterion 30 may be used to optimize high-gradient regions of an image space resulting from an initial image alignment 140, while the dose-difference 34 criterion is used to optimize low-gradient regions of the same image space.

E. Optimizations

From the alignment indexes 145, computer 105 is configured to generate one or more optimizations 150. Optimizations 150 include transformations or values arranged to be applied to target images 120 or to initial image alignments 140 to optimize the initial alignment of images 110 and 120 to form an optimized image 160. The optimizations 150 may be in the form of Radiation Therapy (RT) metrics. Various RT metrics will be known to those skilled in the art, and include, but are by no means limited to, calculating the ratio of an applied dose to GTV (gross tumor volume), calculating the ratio of an applied dose to CTV (critical tumor volume), and calculating the ratio of an applied dose to PTV (plan tumor volume). In general, those skilled in the art will understand that RT metrics are used to determine how well a planned dose distribution 24 meets the requirements of a physician's prescription for the radiation to be delivered to a tumor site as well as to adjacent tissue. Processes by which the system 100 optimizes image alignments to form optimized images 160 will now be discussed in detail with reference to FIG. 3.

III. Process Flow

Figure 3:
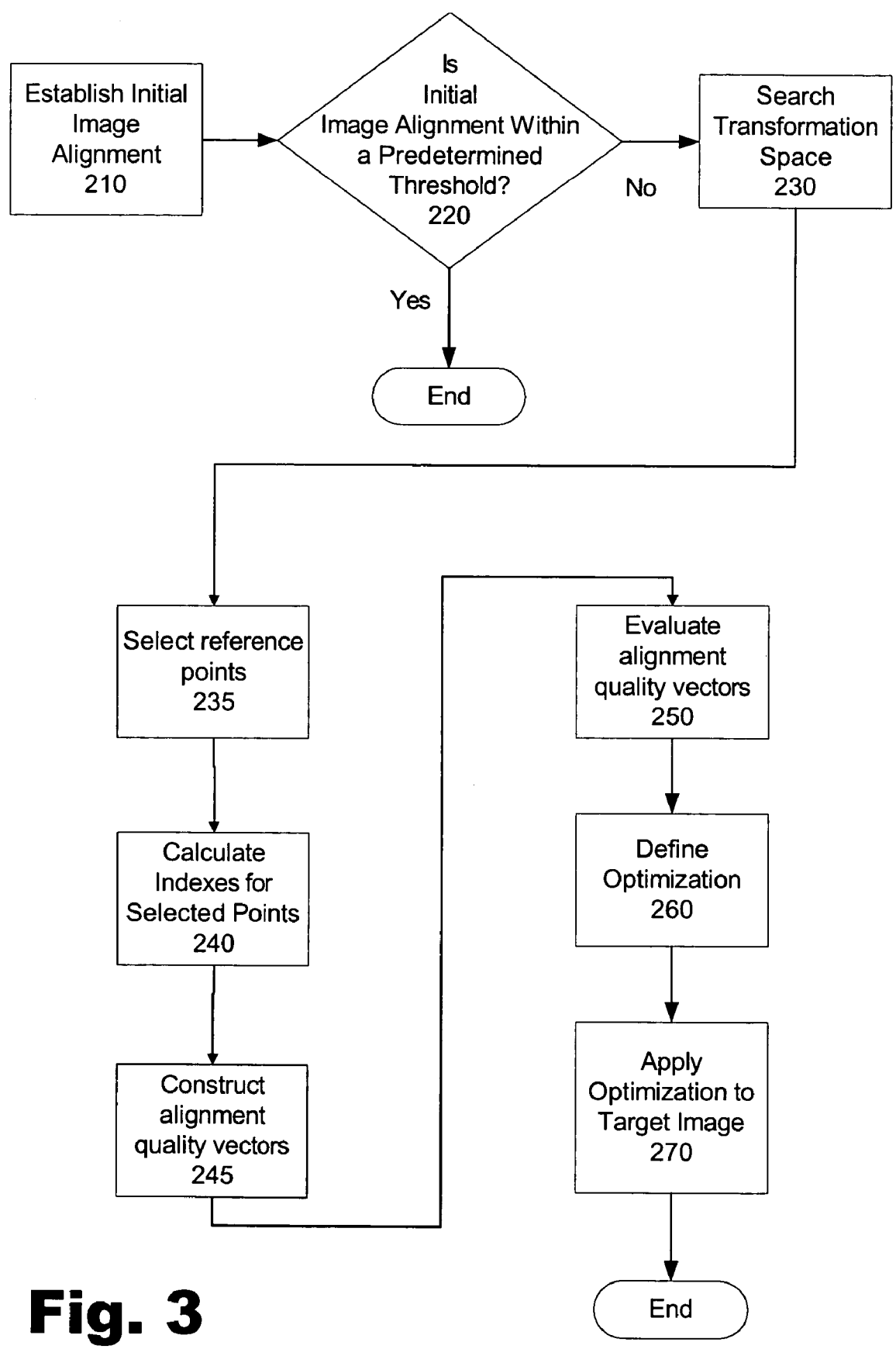
FIG. 3 illustrates a process flow for optimizing image alignments, according to an embodiment.

FIG. 3 illustrates an exemplary process flow for optimizing image alignments according to an embodiment. At step 210, an initial image alignment 140 is established. A reference image 110 and a target image 120 can be aligned to form the initial image alignment 140 at step 210. The step of establishing the initial image alignment 140 can include using any image registration techniques known to those skilled in the art that are capable of being used for registering images. Examples of known transformations 130 that may be used to form the initial image alignment 140 include but are not limited to Affine, point-based, feature-based, landmark-based, shape-based, gradient-based, intensity-based, template matching, cross-correlation, and/or non-linear least squares transformations.

In one embodiment, a point-based image registration process is utilized at step 210 to align a reference image 110 with a target image 120. That is, a number of points are selected in the reference image 110. Selection processes for obtaining these points can include but are not limited to known techniques such as selecting local or global high and/or low gradient points, local or global maxima and/or minima, edges detected by known edge detection algorithms or filters, geometrically significant points selected by the user, or points selected automatically by the distance-to-agreement, dose difference, and/or gamma equations discussed above with reference to FIGS. 1A and 1B. An Affine transformation or other known transformation 130 can then be applied to the selected points to form the initial image alignment 140 by reducing shift, rotational, and/or magnification differences or image warping between the reference and target images 110 and 120.

In one embodiment, the initial image alignment 140 is obtained using the techniques disclosed in U.S. patent application Ser. No. 10/630,015. Using these techniques, selected points are specified in an image and used to define corresponding geometric shapes. The geometric shapes are then used to align two or more images.

Once the initial image alignment 140 is formed at step 210, it is determined at step 220 whether the initial image alignment 140 exhibits an alignment accuracy that is within a predetermined threshold. The predetermined threshold may be determined by a user of the system 100 and/or may be application dependent. Known registration distortion detection and/or goodness-of-fit techniques may be used to identify levels of distortion in the initial image alignment 140. For example, the predefined acceptance criterion (e.g., the composite acceptance criterion 40, DTA criterion 30, or dose-difference criterion 34) discussed above may be used as the predefined threshold for the test in step 220. In one embodiment, if target points 14 of target image 120 are determined to be within a level of accuracy defined by the composite acceptance criterion 40 (see the ellipsoid in FIG. 1B), the test at step 220 is satisfied for those target points 14. Those skilled in the art will understand factors relevant to selecting the predefined threshold, and moreover such factors are discussed in the Van Dyk and Ramsey publications identified above and incorporated by reference herein.

For the test at step 220, determined dose differences can be compared with the predetermined threshold on a point-by-point basis, or an overall dose difference (e.g., the mean dose difference or other calculation based on individual dose differences) can be compared with the predetermined threshold. Similarly, determined DTA values can be compared with the predetermined threshold on a point-by-point basis, or an overall DTA value (e.g., mean DTA or other calculation based on individual DTA determinations) can be compared with the predetermined threshold to help make a determination at step 220 of FIG. 3. In other embodiments, determined dose-difference and DTA values are used in combination to determine whether a predetermined threshold has been satisfied. In these embodiments, the predetermined threshold may be preset to require satisfaction of both the dose-difference criterion 34 and the DTA criterion 30. In some embodiments, composite acceptance criterion 40 may be used as the predetermined threshold in step 220.

Step 220 may be performed automatically by the computer 105 or manually by a user of system 100. In some embodiments, a user may override any automatic test performed at step 220. This provides flexibility to choose to optimize the initial image alignment 140 only if so desired, or to do so regardless of the results of the test performed in step 220. For example, if a user manually selected the reference points used in initial registration but felt unsure about the exactness of the reference points, the user is able to indicate to the system 100 that the test of 220 is not satisfied. Such an indication can be received by computer 105 through any user access device and/or interface discussed above. Alternatively, steps 210 and 220 may be omitted, and the process described with reference to FIG. 3 may begin with step 230, described below.

If it is determined at step 220 that the initial image alignment 140 is within the predetermined threshold, processing ends unless the user manually selects for optimization as discussed above. On the other hand, if it is determined at step 220 that the initial image alignment 140 is not within the predetermined threshold, processing moves to step 230.

At step 230, optimization of the initial image alignment 140 is initiated by determining differences between the initially aligned reference and target images 110 and 120 using known measurement techniques including measuring dose differences and DTAs between points of the images 110 and 120. As discussed above, a dose difference is the measured difference between dosage values of points of the aligned images 110 and 120. A DTA measurement indicates the distance between a point in the reference image 120 and the nearest point in the target image 110 that exhibits the same dose value. A gamma measurement is a particular combination of dose difference and DTA measurements.

The afore-mentioned differences determined in step 230 are determined by searching the transformation space of the initial image alignment 140 using one or more known search techniques (e.g., linear, circular, square, etc.). The transformation space of the initial image alignment 140 may be searched to various extents. For example, the search process of step 230 can be repeated for selected reference point or points 12 in the reference image 110. The extent of the search (e.g., the radius of the search) may be specified by the user to reduce the computational demands of the search. The entire transformation space or one or more regions of the transformation space can be specified for searching. For example, searching may be limited to within specific distances from selected reference points 12, or searching may be limited to areas around critical structures such as tumors or adjacent organs. This allows for limiting an analysis to a particular region of interest, and/or for limiting computational demands on system 100 if so desired. The search is designed to determine dose difference and/or DTA values for each point or selected points in the transformation space. Once a value or values for dose difference and/or DTA have been determined, these values can be used separately or in combination to calculate one or more alignment indexes 145, described in more detail below with reference to step 240.

The result of the search process of step 230 is a set T of transformations 130 [$t_1, t_2 \ldots t_i$] that can be applied to a target image 120.

In step 235, a set P of reference points 12 is identified. It should be understood that one set P of reference points may be applied to one or more target images. Those skilled in the art will understand that methods of identifying points in P may include selecting high gradient points, fiducial points, user-selected points, low entropy points, etc., and will depend on the nature of the particular transformation 130. The set P of reference points 12 for a given transformation in T may be written as a vector, i.e., $$P=[x1 x2 x3 \ldots]$$

Assuming that the search in step 230 yielded more than one transformation in T, P may be represented in a matrix as follows:

$$P = \begin{bmatrix} x1 & y1 & z1 & \cdots \\ x2 & y2 & z2 & \cdots \\ \vdots & \vdots & \vdots & \vdots \\ xi & yi & zi & \cdots \end{bmatrix}$$

At step 240, an alignment quality index 145 such as a gamma index is calculated for each reference point 12 in P. The dose value 22 of each reference point 12 is determined according to known techniques. Known techniques are then used to calculate a DTA value 26 for the reference point 12 by finding the nearest point 14 (e.g., a pixel of the target image 120) to the reference point 12 in the image space resulting from initial image alignment 140 that has a dose value 24 that is within a predefined range of or equal to the dose value 24 associated with reference point 12. This can be done using techniques known to those skilled in the art, including linear, rectangular, circular, spherical, and/or any outwardly expansive search techniques. The predefined range of dose values can be user-defined and/or may be application dependent. Once the target point 14 nearest to the selected reference point 12 is identified, that target point 14 is used to determine the parameter $r_c$ used for calculating the DTA 26 value $r(r_m, r_c)$ as shown above in Equation 6.

The dose value 24 for target point 14 in the target image 120 is then used to calculate the dose difference 28 between the reference point 12 and target point 14 according to Equation 7 above, i.e., by subtracting the reference dose value 22 from the target dose value 24. In one embodiment, the gamma index is calculated for points 12 and 14 according to Equations 4 and 5 above.

Next, in step 245, an alignment quality index vector 147 is constructed for each transformation 130 in T, each alignment quality index vector 147 containing the alignment indexes 145 corresponding to one of the reference points 12 that were selected for the given transformation 130 in step 235. An alignment quality index vector 147 could be represented as $$Q=[\gamma(x1)\gamma(x2)\gamma(x3) \ldots]$$

At step 250, each alignment quality index vector 147 is evaluated. The transformation 130 associated with an alignment quality index vector 147 that best approaches an ideal quality index vector is selected to transform the target image 120. The ideal quality index vector represents the set of alignment indexes 145 that would be obtained if a transformation 130 was to cause target image 120 to align perfectly with reference image 110. Thus, evaluating an alignment quality index vector 147 generally involves computing a distance vector representing the distance of the alignment quality index vector 147 from the ideal quality index vector. Then, methods known to those skilled in the art for evaluating the distance vector by some measure may be used, such as minimum mean, vector norms, root mean square (RMS) of a vector, or geometric distance from the origin of the vector, etc., to determine the degree to which the quality index vector 147 deviates from the ideal quality index vector.

At step 260, an optimization is defined that will be used to transform target image 120 to provide an optimal registration, i.e., alignment, with reference image 110. Generally, one of the measures that may be used in step 250, such as the lowest overall mean of the distance of an alignment quality index vector 147 from an ideal vector, determined in step 250, is used to define one or more optimizations 150. Optimizations 150 include point attributes or values that can be applied to an image to transform the image toward optimal alignment with one or more other images. For example, an optimization 150 may include values and/or attributes representing the lowest overall mean of gamma indexes in a format that can be applied to the target points 14 of the target image 120 to transform the target image 120 toward a better alignment accuracy with the reference image 110 than the initial accuracy of the transformed image 140. In one embodiment, optimizations 150 can be applied to a target image 120 to optimize the initial alignment 140 of the images 110 and 120 by a factor of the lowest overall mean of the gamma indexes.

By selecting the transformation 130 determined to produce the smallest geometric distance in step 250, it is possible to transform the target image by a factor that will reduce the alignment quality index determined from the initial alignment of the images 110 and 120. Using the lowest overall mean of alignment quality indexes 145 such as gamma indexes avoids transforming any target point 14 toward a less accurate alignment with the reference image 110. Thus, the system 100 is configured not to compromise the alignment accuracy of one target point 14 in order to optimize another target point 14 on the same target image 120.

At step 270, optimization 150 is applied to the target image 120 to optimize the initial image alignment 140. This effectively transforms the target image 120 to an improved alignment position with respect to the reference image 110 by a factor (e.g., lowest overall mean of gamma indexes) that is calculated based on quantified goodness-of-fit values. More specifically, system 100 is configured to fine-tune image registrations based on alignment indexes 145, thereby improving the accuracy and precision of image registrations. In one embodiment, the system 100 is configured to perform the above-described optimization steps automatically without user intervention.

As shown in FIG. 3 and described above, the determined alignment quality index 145 may be used by the system 100 to optimize image alignments. For example, a gamma index may be so used. Because the gamma index is based on a combination of dose-difference and DTA criteria, system 100 advantageously is able to automatically adjust to use appropriate alignment criteria based on the local gradients of images. Dose differences are typically useful for determining goodness of fit for low dose gradient regions, while DTA measurements are especially useful for determining goodness of fit for high dose gradient regions of images. Accordingly, the system 100 can be configured to apply a particular alignment criterion based on the gradient of an image or region of an image. For example, the system 100 can automatically give more weight to the DTA criterion 30 for a high-dose gradient region, and little or no weight to DTA criterion 30 for a low-dose gradient region.

While the above description focuses on an embodiment that utilizes a gamma index to determine an optimized image transformation, it is contemplated that in other embodiments an NAT index, DTA index or a dose-difference index could be calculated for each selected point 12 and used independently to determine optimizations 150 that could be applied to optimize the transformed image 140, especially when the images 110 and 120 are heavily weighted with either high or low dose gradient regions. For example, the lowest overall mean of a DTA index or a dose-difference index can be used to define optimizations 150 that will move the images 110 and 120 toward more accurate alignment.

FIG. 3 shows one embodiment of a method for optimizing image alignments. It is contemplated that variations to the embodiment shown in FIG. 3 may be employed, such as utilizing fewer steps or additional steps. For example, some embodiments do not include the determination step 220, thereby subjecting every initial alignment 140 to the optimization processes described above.

IV. Conclusion

As described herein, it is possible to improve the accuracy and precision of image alignments by minimizing difference between initially aligned images. Differences in gamma, DTA, and/or dosage values between aligned images can be advantageously minimized by defining optimizations 150 based on the measured differences and applying the optimizations 150 to the initially aligned images to reduce the same differences.

The preceding description has been presented only to illustrate and describe the present methods and systems. It is not intended to be exhaustive or to limit the present methods and systems to any precise embodiment disclosed. Many modifications and variations are possible in light of the above teachings.

The foregoing embodiments were chosen and described in order to illustrate principles of the methods and systems as well as some practical applications. The preceding description enables others skilled in the art to utilize the methods and systems in various embodiments and with various modifications as are suited to the particular use contemplated. It is intended that the scope of the methods and systems be defined by the following claims.

What is claimed is:

1. A method of optimizing an alignment of a first image having a first set of points and a second image having a second set of points, the method comprising:

selecting at least one point in the first set of points;

selecting at least one point in the second set of points, each selected point in the second set of points corresponding to at least one of the at least one selected points in the first set of points;

calculating at least one alignment index related to the at least one selected point in the second set of points; and generating an optimization based on the alignment index.

2. The method of claim 1, further comprising:

applying the optimization to at least one of the points selected in the second set of points, thereby optimizing the alignment of the second image with the first image.

3. The method of claim 1, wherein said at least one alignment index is a plurality of alignment indexes.

4. The method of claim 3, further comprising defining said optimization based on a lowest overall mean of said plurality of alignment indexes.

5. The method of claim 3, further comprising defining said optimization based upon a shortest geometric distance from an origin of a vector comprising said plurality of alignment indexes.

6. The method of claim 1, wherein said alignment index is based on at least one of a gamma index, a normalized agreement test, a dose difference and a distance-to-agreement measurement.

7. The method of claim 1, wherein said step of selecting at least one point in the first set of points includes automatically selecting the at least one point in the first set of points based on a high or low gradient area of the reference image.

8. A method of optimizing an alignment of a first image having a first set of points and a second image having a second set of points, the method comprising:

selecting at least one point in the first set of points;

selecting at least one point in the second set of points, each selected point in the second set of points corresponding to at least one of the at least one selected points in the first set of points;

calculating at least one alignment index related to the at least one selected point in the second set of points;

comparing the at least one alignment index to a predetermined threshold to determine whether to optimize an alignment of the first image and the second image; and if a determination is made to optimize an alignment of the first image and the second image, generating an optimization based on the at least one alignment index.

9. The method of claim 8, further comprising:

applying the optimization to at least one of the points selected in the second set of points, thereby optimizing the alignment of the second image with the first image.

10. The method of claim 8, wherein said at least one alignment index is a plurality of alignment indexes.

11. The method of claim 10, further comprising defining said optimization based on a lowest overall mean of said plurality of alignment indexes.

12. The method of claim 10, further comprising defining said optimization based upon a shortest geometric distance from an origin of a vector comprising said plurality of alignment indexes.

13. The method of claim 8, wherein said alignment index is based on at least one of a gamma index, a normalized agreement test, a dose difference and a distance-to-agreement measurement.

14. The method of claim 8, wherein said step of selecting at least one point in the first set of points includes automatically selecting the at least one point in the first set of points based on a high or low gradient area of the reference image.

15. A computer-readable medium having instructions thereon for optimizing an alignment of a first image having a first set of points and a second image having a second set of points, said instructions being configured to instruct a computer to perform steps comprising:
- selecting at least one point in the first set of points;
- selecting at least one point in the second set of points, each selected point in the second set of points corresponding to at least one of the at least one selected points in the first set of points;
- calculating at least one alignment index related to the at least one selected point in the second set of points; and
- determining an optimization based on the alignment index.

16. The computer-readable medium of claim 15, said instructions further configured to instruct the computer to perform the step of:
- applying said optimization to at least one of the points selected in the second set of points,
- thereby optimizing the alignment of the second image with the first image.

17. The computer-readable medium of claim 15, wherein said at least one alignment index is a plurality of alignment indexes.

18. The computer-readable medium of claim 17, said instructions further configured to instruct the computer to perform the step of determining said optimization based on a lowest overall mean of said alignment indexes.

19. The computer-readable medium of claim 17, said instructions further configured to instruct the computer to perform the step of defining said optimization based upon a shortest geometric distance from an origin of a vector comprising said plurality of alignment indexes.

20. The computer-readable medium of claim 15, said instructions further configured to instruct the computer to perform the step of calculating said alignment index based on at least one of a gamma index, a normalized agreement test, and a dose difference and a distance-to-agreement measurement.

21. The computer-readable medium of claim 15, said instructions further configured to instruct the computer to perform the step of automatically selecting said at least a subset of the first set of points based on a high or low gradient area of the reference image.

22. The computer-readable medium of claim 15, said instructions further configured to instruct the computer to perform the step of comparing the at least one alignment index to a predetermined threshold to determine whether to optimize an alignment of the first image and the second image.

23. A system for aligning images, the images including a reference image having reference points and a target image having target points, the system comprising:
- a computer configured to perform the steps of:
  - initially aligning the reference image and the target image;
  - determining whether said initial alignment of the reference image and the target image is within a predetermined threshold; and
- optimizing said initial alignment if it is determined at said step of determining that said initial alignment is not within said predetermined threshold, wherein said step of optimizing includes:
  - determining at least one of a dose difference and a distance-to-agreement measurement for each of at least a subset of the reference points;
  - calculating a gamma index for each of said at least a subset of the reference points associated with the reference image, said gamma indexes being based on at least one of said dose difference and said distance-to-agreement measurements;
  - defining an optimization based on the lowest overall mean of said gamma indexes; and
  - applying said optimization to at least a subset of the target points of the target image,
- thereby transforming the target image toward optimal alignment with the reference image.

* * * * *